United States Patent [19]
Klingenberg

[11] Patent Number: 5,195,265
[45] Date of Patent: Mar. 23, 1993

[54] LABELLING METHOD AND SYSTEM HAVING ADHESIVE OVER A MAJORITY OF REAR SURFACE

[76] Inventor: Hans U. Klingenberg, St. Niklaus 4, 3274 Merlingen, Switzerland

[21] Appl. No.: 679,065
[22] PCT Filed: Oct. 4, 1990
[86] PCT No.: PCT/CH90/00236
   § 371 Date: May 29, 1991
   § 102(e) Date: May 29, 1991
[87] PCT Pub. No.: WO91/05322
   PCT Pub. Date: Apr. 18, 1991

[30] Foreign Application Priority Data
   Oct. 5, 1989 [CH] Switzerland ............ 3643/89

[51] Int. Cl.$^5$ ............................................. G09F 3/10
[52] U.S. Cl. ................................. 40/638; 283/81; 206/232
[58] Field of Search ............... 40/678, 299, 312, 594, 40/615; 283/81, 66.1, 66.2, 70; 206/387, 232, 459

[56] References Cited

U.S. PATENT DOCUMENTS

| | | |
|---|---|---|
| 3,148,820 | 9/1964 | Robbins et al. ............. 206/232 X |
| 3,257,228 | 6/1966 | Reed ............................ 40/299 X |
| 4,589,685 | 5/1986 | Lazar .............................. 283/81 |
| 4,714,276 | 12/1987 | Greig . |
| 4,757,901 | 7/1988 | Woods . |
| 4,801,514 | 1/1989 | Will et al. ..................... 40/299 X |
| 4,895,746 | 1/1990 | Mertens . |
| 5,050,909 | 9/1991 | Mertens et al. .................. 283/81 |

FOREIGN PATENT DOCUMENTS

| | | |
|---|---|---|
| 8633368 | 6/1987 | Fed. Rep. of Germany . |
| 8904280 | 8/1989 | Fed. Rep. of Germany . |
| 452479 | 5/1968 | Switzerland . |
| 2055702 | 3/1981 | United Kingdom . |
| 2062576 | 5/1981 | United Kingdom . |
| 2118135 | 10/1983 | United Kingdom . |
| 2132979 | 7/1984 | United Kingdom . |

Primary Examiner—James R. Brittain
Assistant Examiner—James M. Gardner
Attorney, Agent, or Firm—Oliff & Berridge

[57] ABSTRACT

The wording on a label provided on the packaging of a rerecordable recording medium must be able to be altered to suit the contents of new recordings. A separate sheet comprising a plurality of adhesive labels is impractical as the sheet usually cannot be found when the wording on the label needs to be changed. Accordingly, spare labels are arranged in a stack with the labels stuck one on top of the other, each label comprising a tab for peeling it off the stack once the wording on it has become out-of-date. This stack of labels can be stuck directly onto the packaging or be provided as a separate accessory. This labelling method can be adapted for all types of uses, such as the labelling of video cassettes, of cassettes containing a rerecordable magnetic tape or optical disk, of packagings containing floppy disks, or more generally of any packagings the wording on the label of which needs to be altered periodically or according to the contents.

24 Claims, 1 Drawing Sheet

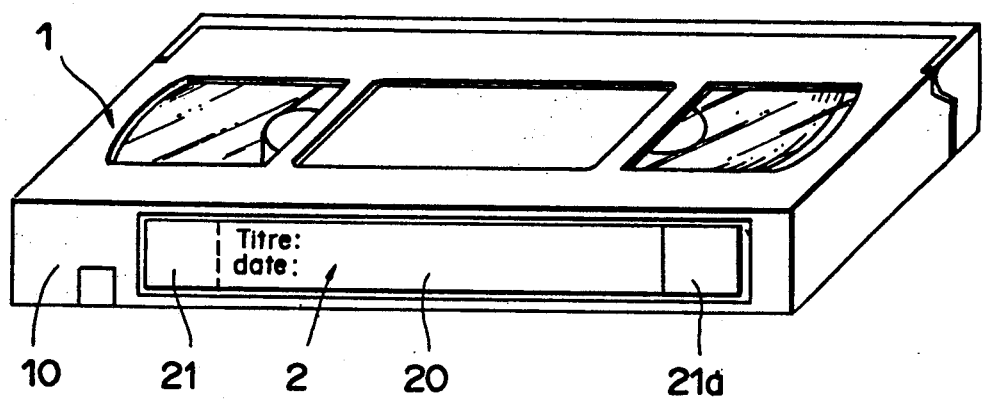
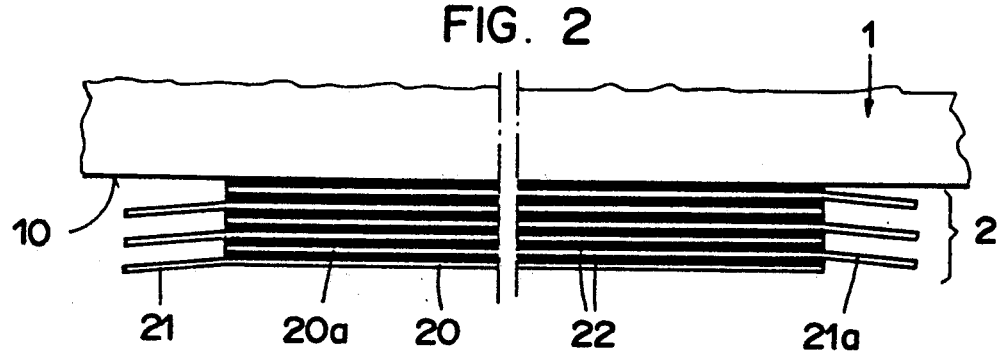
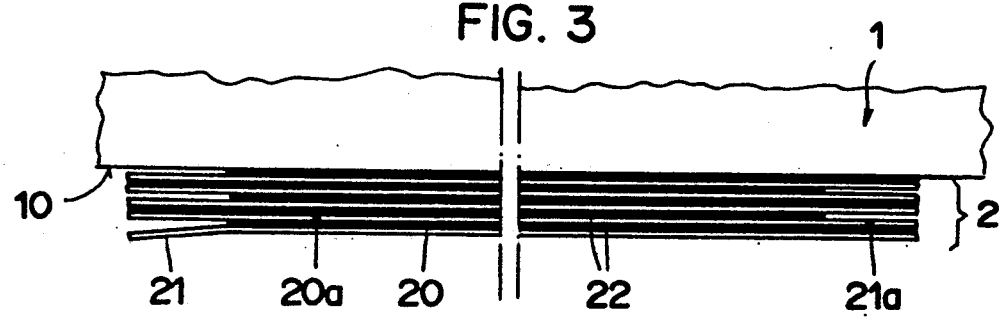

LABELLING METHOD AND SYSTEM HAVING ADHESIVE OVER A MAJORITY OF REAR SURFACE

The invention concerns a method for labelling the packaging of products wherein the wording on the label has to be altered periodically or according to the content of the packaging, and in particular to cassettes or boxes containing a rerecordable recording medium.

Whatever the type of recording medium, whether a magnetic tape or a magnetic or optical disk, it is generally housed in a protective cassette. Labels are supplied with the product, intended to be used to identify the type of recording and/or the contents of the recordings. These labels are supplied in the form of a strip or a sheet bearing a plurality of self-adhesive labels arranged side-by-side, each being separately detachable and being self-adherably attachable to one side of the protective cassette provided for this purpose. When the content of the recordings changes following a new recording, it will be necessary to alter the wording on the label, either by erasing the existing wording and rewriting, or by removing the out-of-date label and replacing it with a new one. The disadvantage of the first method is that it is only possible to write on the label with an erasable means, a pencil for example, thus rendering the label scarcely legible and sometimes not very attractive, especially after a certain number of erasures/rewriting. The problem with the second method, currently the most used, is that very often, when the wording needs to be changed, the spare labels cannot be found.

The labelling method of the invention proposes overcoming these disadvantages by providing spare blank labels directly on the cassette or the box containing the rerecordable recording medium; in this way, the spare labels are always available and a blank label which can be written on with any suitable means is always available.

These labels are preferably provided in a stack of superposed labels, stuck one on top of the other, the top label easily being able to be removed when its wording becomes out-of-date, allowing the following label to appear, the writing surface of which is ready to take the appropriate wording. The number of labels provided in the stack will be adapted to the required use, it could be one or several dozen, for example. In order to facilitate grasping the label to be removed, one edge thereof forming a tab is not adherable to the following label, allowing the label to be grasped easily and removed from the stack. An additional improvement could consist in alternating, from one label to the next, the non-adhesive edge of the label, to be sure when grasping a tab that only one is grasped in order to detach just the top tab; in other words, if, for example, the tab of the top label is on the left of the stack, that of the following label will be on the right, then on the left again and so on to the bottom of the stack.

The adhesive used to secure the labels on top of each other must be such that the hold between the labels is secure, that it is easy to peel off the label at the top of the stack, without the necessity of the label whose wording is out-of-date being readherable elsewhere. The adhesive coating the back of the last label at the bottom of the stack can be of a different type that coating the back of the other labels, because it must affix the whole stack of labels to the cassette or the box containing the recording medium, i.e. to a product generally made of synthetic material. The labels themselves can be of any suitable material, preferably of paper, but they may also be made of plastic material or of paper or cardboard coated with a plastic or metallic laminate.

The drawings show how the labelling method of the invention is applied to a TV video cassette wherein:

FIG. 1 represents a TV video cassette provided with a stack of labels according to the invention, FIG. 2 represents a partial section of a stack of labels to one embodiment of the invention, and FIG. 3 represents a partial section of a stack of labels according to another embodiment of the invention.

The TV video cassette 1 of FIG. 1 comprises a back 10, intended to receive a stack of labels 2 indicating the contents and the other necessary information concerning the recording, for example, date and time of recording, duration, type of recording, etc. The visible label comprises a writing surface 20 for the above-mentioned information, as well as a tab 21, which is easy to grasp in order to detach the label when the information written on the surface 20 becomes out-of-date, in order to allow a new blank label to appear.

FIG. 2 represents a first embodiment of a stack of labels, wherein each tab is free and does not adhere to the back of the preceding label. Thus the adhesive 22 on the back of surface 20 of the top label only covers the surface 20a of the following label, the tab 21a of this label being free, and so on for the following labels. As can be seen, in order to facilitate grasping the tab 21, the tab 21a of the underlying label is situated on the other side of the surface 20. It is therefore possible, by touch or visually, to distinguish the tab to be grasped in order to remove the label by detaching it from the stack by pulling backwards. The tab 21 and the following ones may be of a shape or colour such that they are easily distinguishable from the rest of the label or they may comprise a system of indicators or successive numeration so that the number of labels still remaining in the stack can be identified.

Another embodiment is shown in FIG. 3, wherein the adhesive 22 of the first label also extends into the tab 21a of the following label, so that only the tab 21 is visible, thus facilitating the choice of tab to be grasped to remove the top label as described previously.

This labelling method has been shown and described as adapted to the labelling of a TV video cassette; obviously, it can be adapted just as well to other forms of rerecordable recording media, or to computer disk packaging and, by extension, to any packaging or container where the wording of the label needs to be altered periodically or according to the contents.

Of course, the stack of labels supplied pre-affixed to the appropriate point on the packaging is also available as a separate accessory, to allow it to be affixed to packagings which already exist, in order that they may also benefit from the advantages of this labelling method, and in order to allow the stack of labels of a packaging to be replaced when the original stack of labels is finished. Of course, the sticky back of the last label is protected by a protective sheet which can be removed before affixing the stack of labels to the appropriate point on the packaging.

Each label can also serve to bear an advertisement or a trademark, the corresponding inscription appearing on the tab and/or on the rest of the label, it being understood of course, that a sufficiently large blank space should be reserved for the wording on the label.

The whole label or just one part thereof may be of a colour such that it allows a differentiation of the type of contents or recording; for example, a stack of labels of a certain colour will be reserved for labelling magnetic tapes or classical music records, another colour being chosen for jazz and yet another for ballads, etc.

This stack of labels according to the method, simple in design and manufacture, does not cost more than that currently supplied commercially and makes it possible always to have available a blank label, ready to take a new wording.

I claim:

1. A method for labelling a product having a packaging, wherein the wording of the label needs to be altered periodically or according to the contents of said packaging, comprising:

providing a plurality of labels in a stack on said packaging, each label having a non-adhesive indicia-receiving front surface and an adhesive rear surface facing opposite from said front surface and including adhesive on a majority of said rear surface, said labels being detachably adhered one on top of the other so that the adhesive from each label overlies the indicia-receiving front surface of an underlying label, except for the lowermost label in the stack, each label being able to be easily detached from the underlying label in order to make available the non-adhesive indicia-receiving front surface of the underlying label, removing an uppermost label from said stack so as to expose the indicia-receiving front surface of the underlying label, and recording information regarding the contents of said packaging on the indicia-receiving front surface of the underlying label when it is desired to alter the wording of the uppermost label.

2. The labelling method according to claim 1, wherein each label comprises a non-adhesive edge part comprising a portion of said rear surface where said adhesive is not provided in order to facilitate grasping.

3. The labelling method according to claim 2, wherein the non-adhesive edge part of each label is alternately disposed with regard to the non-adhesive edge part of the underlying label.

4. The labelling method according to claim 1, wherein said packaging is a cassette containing a rerecordable recording medium.

5. The labelling method according to claim 4, wherein said rerecordable recording medium is a video tape, and said cassette is a video cassette.

6. The labelling method of claim 3, wherein the non-adhesive edge part of each label extends outwardly from a portion of the stack containing an adhesive part of each label where said adhesive is provided on said rear surface, and the adhesive part of each label is located only in said adhesive containing portion of said stack.

7. The labelling method of claim 2, wherein the non-adhesive edge part of each label extends outwardly from a portion of the stack containing an adhesive part of each label where said adhesive is provided on said rear surface, and the adhesive part of each label is located only in said adhesive containing portion of said stack.

8. The labelling method of claim 3, wherein an adhesive part of each label where said adhesive is provided on said rear surface extends onto and is adhered to the non-adhesive edge part of the underlying label.

9. The labelling method of claim 1, wherein a backside of a lowermost label in said stack has an adhesive different from an adhesive on the other labels in said stack.

10. A labelling system for labelling a product, wherein the wording of the label needs to be altered periodically or according to the contents of a packaging of the product, comprising:

a plurality of labels arranged in a stack, each label having a non-adhesive indicia-receiving front surface and an adhesive rear surface facing opposite from said front surface and including adhesive on a majority of said rear surface, the adhesive on the rear surface of each label in the stack, with the exception of a lowermost label, overlying and being detachably adhered to the non-adhesive indicia-receiving front surface of an underlying label so that when a label is removed from the underlying label in the stack, the indicia-receiving front surface of the underlying label is made available for writing; said adhesive providing means for removably fastening the labels in said stack so as to allow an uppermost label of the stack to be removed to expose the indicia-receiving front surface of the underlying label to permit information regarding the contents of the packaging to be recorded on the front surface of said underlying label when it is desired to alter the wording of the uppermost label.

11. The labelling system of claim 10, further comprising:

a product including a packaging to be labelled, supplied with said stack of labels.

12. The labeling system of claim 11, wherein the lowermost label in said stack is affixed to the packaging of said product.

13. The labelling system of claim 12, wherein said packaging is a cassette containing a recordable recording medium, and said labels are sized to fit on a surface of said cassette.

14. The labelling system of claim 13, wherein said packaging is a video cassette, said recordable recording medium is a video tape, and said labels are sized to fit on a narrow back side of said video cassette.

15. The labelling system of claim 10, wherein each label has a non-adhesive edge part comprising a portion of said rear surface where said adhesive is not provided in order to facilitate grasping.

16. The labelling system of claim 15, wherein the non-adhesive edge part of each label is alternately disposed with regard to the non-adhesive edge part of the underlying label.

17. The labelling system of claim 16, wherein the non-adhesive edge part of each label extends outwardly from a portion of the stack containing an adhesive part of each label where said adhesive is provided on said rear surface so that the adhesive part of each label is located only in said adhesive containing portion of said stack.

18. The labelling system of claim 16, wherein an adhesive part of each label where said adhesive is provided on said rear surface extends onto and is adhered to the non-adhesive edge part of the underlying label.

19. The labelling system of claim 10, wherein a backside of the lowermost label in said stack has an adhesive different from an adhesive on the other labels in said stack.

20. A labelling system for labelling a cassette containing a rerecordable recording medium, wherein the wording of the label needs to be altered periodically or according to the contents of said cassette, comprising:

a plurality of labels arranged in a stack, each label having a non-adhesive indicia-receiving front surface and an adhesive rear surface facing opposite from said front surface and including adhesive on a majority of said rear surface, the adhesive on the rear surface of each label in the stack, with the exception of a lowermost label, overlying and being detachably adhered to the non-adhesive indicia-receiving surface of an underlying label so that when a label is removed from the underlying label in the stack, the indicia-receiving front surface of the underlying label is made available for writing, wherein each label is sized to fit on a surface of a cassette containing a rerecordable recording medium, said adhesive providing means for removably fastening the labels in said stack so as to allow an uppermost label of the stack to be removed to expose the indicia-receiving front surface of the underlying label to permit information regarding the contents of the packaging to be recorded on the front surface of said underlying label when it is desired to alter the wording of the uppermost label.

21. The labelling system of claim 20, wherein said labels are sized to fit on a narrow back side of a video cassette containing a video tape.

22. The labelling system of claim 20, further comprising:

a cassette containing a rerecordable recording medium supplied with said stack of labels, the lowermost label in said stack affixed to a surface of said cassette.

23. The labelling system of claim 20, wherein each label has a non-adhesive edge part comprising a portion of said rear surface where said adhesive is not provided in order to facilitate grasping.

24. The labelling system of claim 23, wherein the non-adhesive edge part of each label is alternately disposed with regard to the non-adhesive edge part of the underlying label.

* * * * *